United States Patent
Tamaki

(10) Patent No.: US 8,064,309 B2
(45) Date of Patent: Nov. 22, 2011

(54) RECORDING/PLAYBACK APPARATUS AND LASER DRIVE PULSE ADJUSTING METHOD

(75) Inventor: Tatsuya Tamaki, Tokyo (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 11/856,302

(22) Filed: Sep. 17, 2007

(65) Prior Publication Data

US 2008/0291797 A1 Nov. 27, 2008

(30) Foreign Application Priority Data

Sep. 26, 2006 (JP) ................. 2006-260296

(51) Int. Cl.
*G11B 7/0045* (2006.01)
(52) U.S. Cl. ................................. 369/59.12
(58) Field of Classification Search ............... 369/59.12
See application file for complete search history.

(56) References Cited

U.S. PATENT DOCUMENTS

| | | | | |
|---|---|---|---|---|
| 5,475,666 A | * | 12/1995 | Ito et al. | 369/47.52 |
| 6,188,656 B1 | * | 2/2001 | Shoji et al. | 369/47.25 |
| 2007/0041293 A1 | * | 2/2007 | Lee et al. | 369/47.53 |
| 2007/0121461 A1 | * | 5/2007 | Kobayashi et al. | 369/59.11 |
| 2007/0127341 A1 | * | 6/2007 | Sagara et al. | 369/59.11 |

FOREIGN PATENT DOCUMENTS

| | | |
|---|---|---|
| JP | 2000-182244 | 6/2000 |
| JP | 2000-207742 | 7/2000 |
| JP | 2003-30837 | 1/2003 |
| JP | 2003-331427 | 11/2003 |
| JP | 2004-139649 | 5/2004 |
| JP | 2004-355727 | 12/2004 |
| JP | 3632849 | 1/2005 |
| JP | 2005-38473 | 2/2005 |
| JP | 3766994 | 2/2006 |
| WO | WO 2005029479 A1 * | 3/2005 |

* cited by examiner

*Primary Examiner* — Will J Klimowicz
*Assistant Examiner* — Mark Fischer
(74) *Attorney, Agent, or Firm* — Oblon, Spivak, McClelland, Maier & Neustadt, L.L.P.

(57) ABSTRACT

A recording/playback apparatus includes an optical head unit, a laser drive pulse generator, a power setting unit, an evaluation value calculator, and an adjustment controller. The adjustment controller performs control such that recording operations for adjusting laser drive pulses are performed on an optical recording medium by changing the adjustment setting for the laser drive pulses to different adjustment setting conditions under a condition that each of two or more levels of power of the laser light is set to obtain a quality evaluation value for each adjustment setting condition, and determines the adjustment setting for the laser drive pulses on the basis of the obtained quality evaluation value, and sets the determined adjustment setting in the laser drive pulse generator.

13 Claims, 8 Drawing Sheets

RECORDING/PLAYBACK APPARATUS AND LASER DRIVE PULSE ADJUSTING METHOD

CROSS REFERENCES TO RELATED APPLICATIONS

The present invention contains subject matter related to Japanese Patent Application JP 2006-260296 filed in the Japanese Patent Office on Sep. 26, 2006, the entire contents of which are incorporated herein by reference.

BACKGROUND OF THE INVENTION

1. Field of the Invention

The present invention relates to recording/playback apparatuses for recording or playing back optical recording media, such as recording optical discs, and also relates to laser drive pulse adjusting methods. In particular, the invention relates to a technique for suitably performing laser drive pulse adjustments in consideration of a case where the optimum recording power is changed due to various conditions.

2. Description of the Related Art

In optical-disc recording technologies, a recording parameter representing, for example, a recording waveform formed by a laser, is referred to as a "write strategy", and a laser is emitted on the basis of this write strategy so that information can be recorded. When recording information on optical discs, the recording parameter forming the write strategy is adjusted to implement the high recording quality. This is referred to as "write strategy adjustments".

The write strategy adjustments are performed by making correction to a reference strategy. The reference strategy is a basic strategy, which is a predetermined reference. A specific numerical value of the reference strategy can be set by a media manufacturer (prestored in a medium) or is prestored in a drive.

Generally, the write strategy adjustments can be performed for each optical disc to be loaded in a drive. That is, the write strategy is closely related to the material and thickness of the recording film of an optical disc, the configuration of the grooves, the recording speed, etc. It is thus necessary that the write strategy be optimized for each optical disc.

Write strategy adjustments are also necessary for absorbing variations in drives.

In this case, it is necessary that a drive perform write strategy adjustments. The reasons for this are as follows.

In the market, many types of optical discs that are difficult to be handled by drive manufacturers are distributed, and to set suitable write strategies for all optical discs distributed in the market, numerous steps are necessary. This is time-consuming and also raises the cost of drives. Additionally, handling media that are distributed after drives are shipped requires updating of the firmware of the drives, which is also time-consuming.

Because of the above-described reasons, it is demanded that write strategy adjustments be performed by a drive when performing recording.

In recording optical discs, before recording actual data, calibration is generally performed by means of test recording so that optimum recording power can be calculated. Such a calibration operation is referred to as "optimum power control" (OPC).

By performing OPC, even if an objective lens is stained, for example, the optimum recording power can be reset, and the recording quality can be effectively maintained.

However, even if the recording power is optimized by performing OPC, there is a possibility that the optimized recording power be changed due to various factors, such as variations in the recording sensitivity on the disc surface, a change in the temperature of a pickup, variations in the thickness of the substrate of the optical disc, and stain on the optical disc. As a result, the recording power set by performing OPC may deviate from the optimum point.

From this point of view, it is necessary to adjust the write strategy such that relatively high recording characteristics can be maintained even if the recording power deviates from the optimum point. That is, it is necessary that the recording power margin is wide.

To ensure a wide recording power margin, write strategy adjustments are hitherto performed by the following approaches.

One approach is to manually perform write strategy adjustments. First of all, recording/playback is performed by the use of a certain level of recording power, and then, a write strategy that can improve the quality of a recording signal with this recording power is searched. Then, it is checked whether the recording power margin is increased with the searched write strategy. If the recording power margin is not increased, another write strategy is searched. Such an operation is repeated through trial-and-error operations.

Another approach is as follows. Write strategy adjustments are performed with a certain level of recording power (e.g., the recording power optimized by performing OPC) by the use of a reference strategy as an initial value so that the quality of a recording signal with this recording power is improved. That is, the write strategy is adjusted to a strategy that can maximize the quality of a recording signal with a certain level of recording power, and it is assumed that the quality of a recording signal is also improved with another level of recording power.

Patent Numbers 3766994 and 3632849 and Japanese Unexamined Patent Application Publication No. 2000-182244 are examples of the above-described related art.

SUMMARY OF THE INVENTION

However, the above-described related art presents the following problems.

In the approach to manually performing write strategy adjustments, the use of trial-and-error operations takes a lot of time to perform adjustments. Whether or not the optimum write strategy can be searched in considerably a short time largely depends on the technical knowledge of an operator who performs write strategy adjustments.

In the other approach, the write strategy adjustments are performed with only one level of recording power. This does not necessarily increase the power margin. Conversely, performing adjustments with only one level of recording power may decrease the power margin.

FIG. 8 is a diagram illustrating a characteristic curve of an evaluation value (jitter) in relation to a change in the recording power under the condition that the write strategy is optimized by the use of the recording power optimized by performing OPC. In this diagram, the horizontal axis represents the recording power, and the vertical axis designates the evaluation value.

The recording power optimized by performing OPC may deviate from the real optimum recording power due to various factors. In FIG. 8, the real optimum recording power is indicated by Pw-i, and the position of the recording power that deviates from the real optimum recording power is indicated by Pw-d.

When the position of the deviated recording power Pw-d coincides with the real optimum recording power Pw-i, as shown in FIG. 8, the jitter is considerably a low value in relation to the allowance value (i.e., the line that guarantees proper playback of a signal) indicated by the broken line in FIG. 8. In this case, a high-quality recording signal can be maintained.

In contrast, when the recording power is shifted to the position Pw-d, the jitter value sometimes exceeds the allowance value, as shown in FIG. 8, which may lead to a failure in playback of a signal recorded with such deviated recording power.

In view of the above-described problems, a recording/playback apparatus according to an embodiment of the present invention is configured as follows.

A recording/playback apparatus of an embodiment of the present invention includes the following elements. Optical head means applies laser light to an optical recording medium to read and write information represented by marks and spaces from and into the optical recording medium. Laser drive pulse generating means generates laser drive pulses in accordance with information to be recorded and supplies the generated laser drive pulses to the optical head means to allow the optical head means to apply laser light for recording the information. Power setting means sets power of the laser light. Evaluation value calculating means calculates a quality evaluation value, which serves as an index to the quality of a signal recorded on the basis of a setting condition that the laser drive pulses are set, from a signal read from the optical recording medium by the optical head means. Adjustment control means performs an adjustment setting for the laser drive pulses generated by the laser drive pulse generating means. The adjustment control means performs control such that recording operations for adjusting the laser drive pulses are performed on the optical recording medium by changing the adjustment setting for the laser drive pulses to different adjustment setting conditions under a condition that each of two or more levels of power of the laser light is set so as to obtain a quality evaluation value for each adjustment setting condition under a condition that each level of power of the laser light is set by inputting a quality evaluation value calculated by the evaluation value calculating means when a signal recorded during each of the recording operations is read, and determines the adjustment setting for the laser drive pulses on the basis of the quality evaluation value obtained for each adjustment setting condition under a condition that each level of the power of the laser light is set, and sets the determined adjustment setting in the laser drive pulse generating means.

With this configuration, based on the quality evaluation values obtained by playing back data which is test-recorded by changing the adjustment setting (write strategy) under the condition that two or more levels of power of laser light are set, the write strategy is adjusted. It is thus possible to determine the write strategy that can improve the total recording quality under the condition that a plurality of levels of recording power are set.

As described above, according to an embodiment of the present invention, the write strategy that can improve the total recording quality under the condition that a plurality of levels of recording power are set can be determined. Accordingly, unlike an example of the related art in which the strategy is adjusted on the basis of a quality evaluation value obtained under a condition that only one level of recording power is set, a high recording quality can be maintained to such a degree as to absorb deviation of the recording power from the optimum point.

Additionally, according to the method of an embodiment of the present invention, the write strategy adjustments can be automatically performed by the recording/playback apparatus. Thus, unlike an example of the related art in which the write strategy is adjusted to the optimum point manually through trial-and-error operations. This eliminates the need for the manual operation.

The method of an embodiment of the present invention can also be performed manually. In this case, the operation is far less time-consuming, compared with a case where adjustments are performed through trial-and-error operations.

DESCRIPTION OF THE PREFERRED EMBODIMENTS

Figure 1:
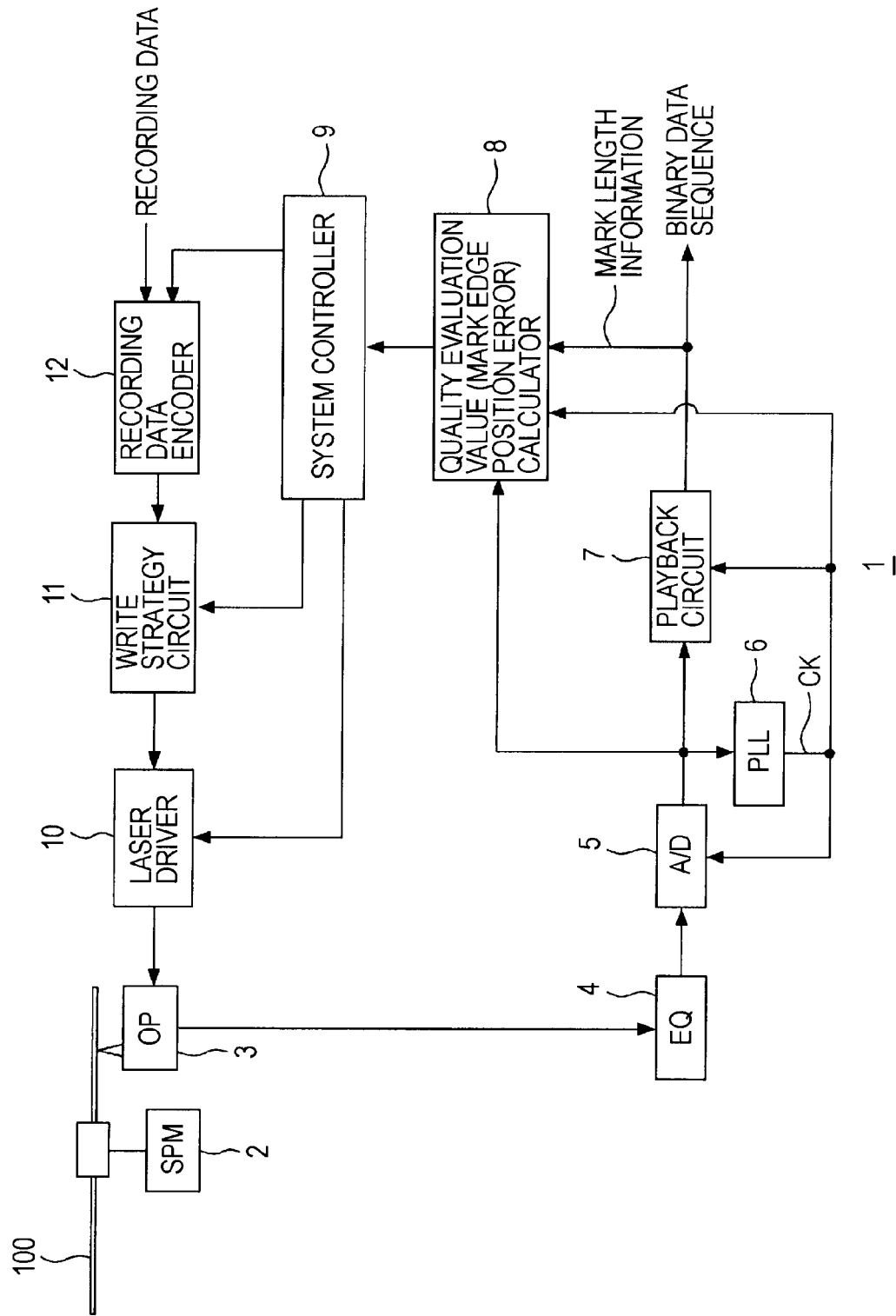
FIG. 1 is a block diagram illustrating the essential portions of a recording/playback apparatus according to an embodiment of the present invention.

An embodiment of the present invention is described below in the following order.
1. Configuration of Recording/Playback Apparatus
2. Basic Concept of Strategy Adjustments
3. Strategy Adjustment Operation
4. Processing
1. Configuration of Recording/Playback Apparatus FIG. 1 is a block diagram illustrating the essential portions of a recording/playback apparatus 1.

An optical disc 100, which serves as a recording medium for recording information thereon, is driven by a spindle motor 2 when performing a recording/playback operation.

An optical head 3 (optical pickup (OP)) applies laser light emitted from a laser diode to the optical disc 100 through an objective lens via a predetermined optical system. The optical head 3 also guides light reflected by the optical disc 100 to a photodetector through a predetermined optical system so that an electric signal in accordance with the amount of reflected light can be obtained. The optical head 3 also executes computation on light amount signals detected by a plurality of photodetectors to generate a playback signal (playback RF signal) for playing back information recorded on the optical disc 100 and various servo error signals, such as a tracking error signal and a focus error signal.

When performing a recording operation, laser drive pulses are supplied from a laser driver 10 to the optical head 3, and the laser diode within the optical head 3 is driven to emit light in accordance with the laser drive pulses.

Also when performing a recording operation, a recording data encoder 12 performs encoding, for example, run length limited coding (1, 7), on recording data to be recorded on the optical disc 100, and supplies an encoded signal to a write strategy circuit 11. The write strategy circuit 11 generates laser drive pulses in accordance with the encoded signal. The pulse levels and the pulse edge positions of the laser drive pulses generated in the write strategy circuit 11 are adjusted by a set value supplied from a system controller 9.

The laser drive pulses generated and subjected to power strategy adjustments in the write strategy circuit 11 serve as a drive signal for driving the laser diode within the optical head 3 through the laser driver 10.

Also when performing a recording operation, calibration for the recording power is performed through OPC processing, and the level of the recording power optimized by the OPC processing is set in the laser driver 10.

The OPC processing is performed under the control of the system controller 9, and the system controller 9 sets the level of the recording power optimized by the OPC processing in the laser driver 10. This makes it possible to perform a recording operation with the optimum recording power.

When performing a playback operation, a playback signal read by the optical head 3 is processed in an equalizer 4 and is sampled in the analog-to-digital (A/D) converter 5 so that it is converted into a digital value.

A phase-locked loop (PLL) circuit 6 receives the digital playback signal from the A/D converter 5 and generates a playback clock CK that is synchronized with the playback signal. The playback clock CK is used as a sampling clock for the A/D converter 5 and is also used as a processing clock for a playback circuit 7 and a quality evaluation value calculator 8, which are located subsequent to the PLL circuit 6.

The playback signal represented by the sampling values supplied from the A/D converter 5 is output, as shown in FIG. 1, to the playback circuit 7 and the quality evaluation value calculator 8.

The playback circuit 7 receives the playback signal represented by the sampling values from the A/D converter 5 to decode a binary data sequence recorded on the optical disc 100. In this case, the playback circuit 7 decodes the binary data sequence by performing, for example, partial response maximum likelihood (PRML) decode processing.

The playback circuit 7 includes an equalizer for performing partial response (PR) equalization in accordance with a predetermined PR scheme and a maximum likelihood decoder. The playback signal represented by the input digital value is subjected to PR equalization in the equalizer and is then subjected to Viterbi decoding in the maximum likelihood decoder so that bits are detected. The Viterbi decoded data (binary data sequence) is supplied to a playback processing system (not shown).

The binary data sequence is also supplied, as shown in FIG. 1, to the quality evaluation value calculator 8 as mark length information.

The quality evaluation value calculator 8 calculates mark edge position errors on the basis of the sampling values of the playback signal supplied from the A/D converter 5, the playback clock CK supplied from the PLL circuit 6, and the mark length information supplied from the playback circuit 7. The mark edge position errors serve as the quality evaluation values in this embodiment.

In this case, the quality evaluation value calculator 8 can detect the front mark edge (leading edge) position error and the rear mark edge (trailing edge) position error on the basis of the sampling values of the playback signal and the playback clock CK.

From the binary data sequence supplied from the playback circuit 7, information concerning the mark-lengths/space-lengths of the playback signal can be obtained as the above-described mark length information. Based on such mark length information, the quality evaluation value calculator 8 can calculate the front/rear mark edge position errors for each mark length or for each combination of a mark length and a space length before and after a subject edge.

In this example, the data sequence before being subjected to PR equalization in the playback circuit 7, i.e., the playback signal output from the A/D converter 5, is supplied to the quality evaluation value calculator 8, and based on this playback signal, the mark edge position errors are calculated. Alternatively, the playback signal after PR equalization may be input into the quality evaluation value calculator 8 so that the mark edge position errors can be calculated.

A specific calculation method for mark edge position errors by the quality evaluation value calculator 8 is described below.

Information concerning mark edge position errors, which serve as quality evaluation values calculated by the quality evaluation value calculator 8, is supplied to the system controller 9.

The system controller 9 is formed of a microcomputer including memory devices, such as a read only memory (ROM) and a random access memory (RAM), and a central processing unit (CPU).

The system controller 9 calculates the optimum write strategy, as described below, by the use of the information concerning the mark edge position errors, and sets the calculated optimum write strategy in the write strategy circuit 11. The focus servo and tracking servo operations or the shifting (sled) operation by the optical head 3 are performed by a servo circuit or servo drive mechanisms (such as a biaxial mechanism and a sled mechanism within the optical head 3). The driving of the spindle motor 2 is also controlled by the servo circuit. The system controller 9 provides an instruction to the servo circuit to control the driving of the spindle motor 2 or the behavior of the optical head 3 so that a recording or playback operation can be performed on the optical disc 100.

The calculation method for mark edge position errors performed by the quality evaluation value calculator 8 is as follows.

The mark edge position errors, which are used as quality evaluation values in performing write strategy adjustments, are defined as the difference between the edge positions of an ideal recording mark and the edge positions of an actual recording mark.

The recording mark edge positions include a front edge position, which is located at the boundary with the previous space, and a rear edge position, which is located at the boundary with the subsequent space. Accordingly, the mark edge position error at the front edge position is referred to as the "front mark edge position error", and the mark edge position error at the rear edge position is referred to as the "rear mark edge position error".

To discuss the calculation method for mark edge position errors, the following two terms are defined:

Adjustment pattern: pattern to be subjected to write strategy adjustments; and

Reference pattern: pattern not to be subjected to write strategy adjustments since deviation of such a pattern rarely occurs, e.g., a pattern having a long mark and a long space before or after the long mark.

The "pattern" in the above terms means a combination of a space length and a mark length before and after a subject edge.

The calculations for mark edge position errors are performed by the following procedures (1) and (2).

(1) Calculations for Mark Edge Positions

Figure 2:
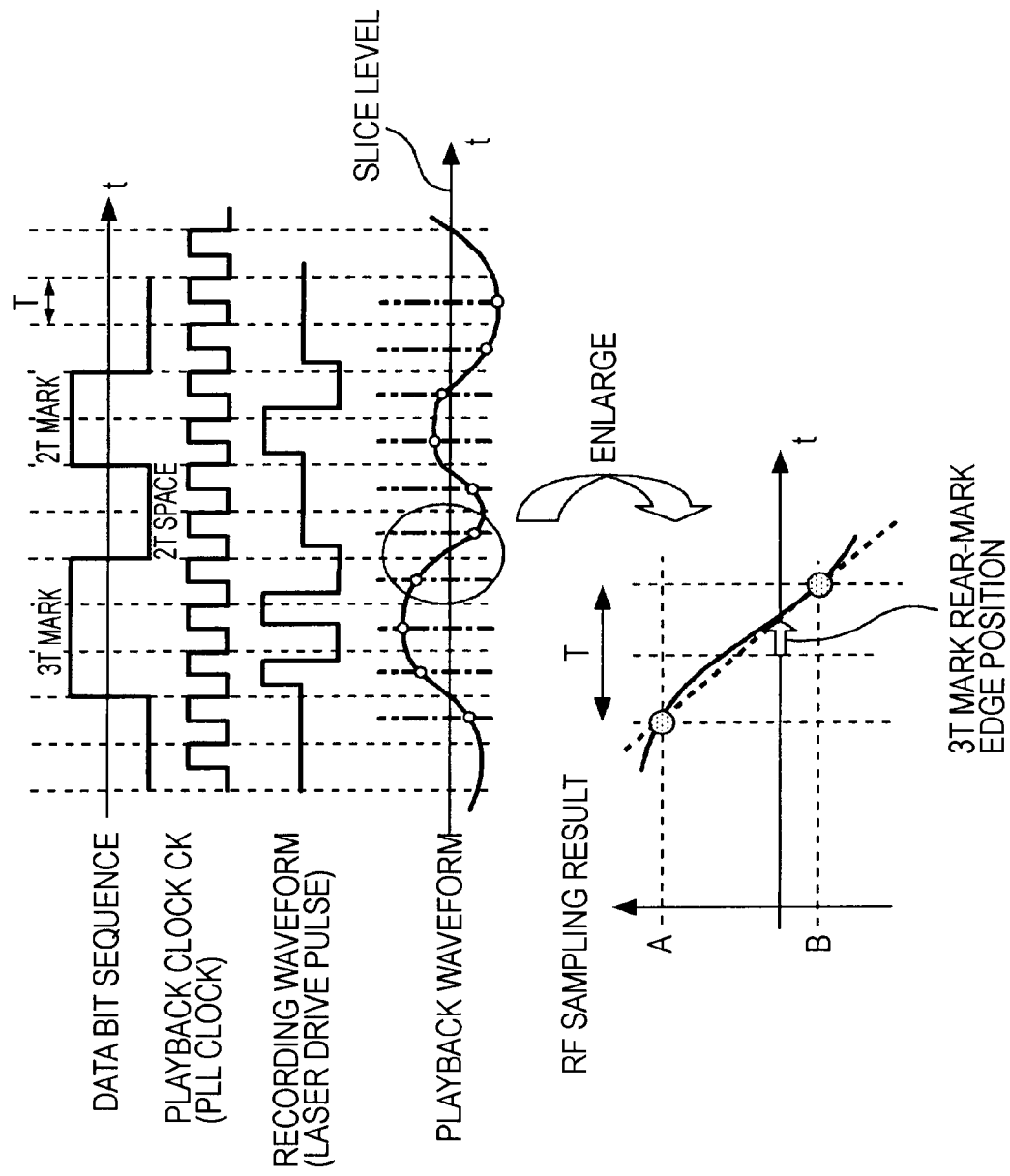
FIG. 2 illustrates an approach to calculating mark edge positions.

The mark edge positions are first discussed with reference to FIG. 2. The mark edge positions are represented by the time difference between the cross points of the playback waveform and the slice level shown in FIG. 2 (hereinafter such cross points are referred to as "zero cross points") and the playback clock CK (PLL clock). In particular, the mark edge position at the front edge position is referred to as the "front mark edge position", and the mark edge position at the rear edge position is referred to as the "rear mark edge position". In FIG. 2, T indicates the channel clock cycle.

The playback waveform is sampled, as shown in FIG. 2, in every cycle T in synchronization with the playback clock CK. To calculate either the front mark edge position or the rear mark edge position, the mark edge position Mep can be expressed by the following equation (1):

$$Mep = \frac{T}{2} \cdot \frac{(A+B)}{(A-B)} \quad (1)$$

where A indicates the sampling value of the playback signal immediately before the zero cross point of the playback waveform and B represents the sampling value of the playback signal immediately after the zero cross point.

The mark edge positions found by equation (1) are continuously measured in a measurement zone for each adjustment pattern and are averaged. For example, in a certain measurement zone of a pattern from a 2T space to the front mark edge position of a 3T mark, the mark edge positions are continuously measured and are averaged, and the resulting value is represented by MepF (2s3m).

(2) Calculations for Mark Edge Position Errors

The mark edge position errors are calculated to be the difference between the position of an adjustment pattern and the position of a reference pattern. That is, the mark edge position error is calculated for each of the front edge and the rear edge as follows.

Mark edge position error=mark edge position of an adjustment pattern−mark edge position of a reference pattern For example, if the adjustment pattern ranges from a 2T space to the front mark edge position of a 3T mark, and the reference pattern ranges from a 5T space or longer to the front mark edge position of a 5T mark or longer, the front mark edge position error of the adjustment pattern from a 2T space to the front mark edge position of a 3T mark can be expressed by the following equation (2).

$$MepeF(2s3m)=MepF(2s3m)-MepF(\geq 5s \geq 5m) \quad (2)$$

Similarly, the rear mark edge position error of the adjustment pattern from a 3T space to the rear mark edge position of a 2T mark can be expressed by the following equation (3).

$$MepeR(3m2s)=MepR(3m2s)-MepR(\geq 5m \geq 5s) \quad (3)$$

The quality evaluation value calculator 8 calculates the front mark edge position error and the rear mark edge position error for each combination of a mark length and a space length (i.e., for each adjustment pattern) according to the above-described procedures.

More specifically, on the basis of the playback signal (sampling values), the playback clock CK, and the mark length information, which are input when a certain measurement is played back, the quality evaluation value calculator 8 calculates the front mark edge position and the rear mark edge position of a reference pattern (in this case, a pattern ranging from a 5T space or longer to a 5T mark or longer) and those of an adjustment pattern according to equation (1).

In this case, the front mark edge position and the rear mark edge position can be calculated by averaging a plurality of values obtained for each adjustment pattern as described above.

Then, for each adjustment pattern, the value of the front mark edge position of the reference pattern is subtracted from that of the adjustment pattern so that the front mark position error can be calculated. Similarly, the value of the rear mark edge position of the reference pattern is subtracted from that of the adjustment pattern so that the rear mark position error can be calculated.

In this manner, the quality evaluation value calculator 8 calculates the front mark edge position error and the rear mark edge position error for each adjustment pattern.

2. Basic Concept of Strategy Adjustments

As described above, hitherto, the power margin is improved by the following approach. Write strategy adjustments are performed with only one level of recording power (e.g., recording power optimized by performing OPC) by the use of a reference strategy as an initial value so that the quality of a recording signal with this recording power is improved. That is, the write strategy is adjusted to a strategy that can maximize the quality of a recording signal with a certain level of recording power, and it is assumed that the quality of a recording signal is also improved with another level of recording power.

In this approach, however, there is a possibility that the optimized recording power be changed due to various factors, such as variations in the recording sensitivity on the disc surface, a change in the temperature of a pickup, variations in the thickness of the substrate of the optical disc, and stain on the optical disc. As a result, if the recording power deviates from the optimum recording power, it is difficult to maintain a high quality of a recording signal.

That is, in the approach to optimizing the write strategy under the condition that only one level of recording power is set, although the quality of a recording signal with that level of recording power can be maximized, if the recording power deviates from the optimum point, it is difficult to maintain a sufficiently high quality of a recording signal. In other words, the margin of a recording signal quality to compensate for deviations from the optimum point of the recording power (i.e., the power margin) may be decreased.

In this embodiment, therefore, instead of performing write strategy adjustments with only one level of recording power, test recording is performed by varying the write strategy for each of different levels of recording power, and based on the resulting quality evaluation values (in this embodiment, the mark edge position errors), the optimum write strategy value is calculated.

More specifically, the sum of the squares of quality evaluation values obtained by varying the write strategy for each of different levels of recording power is set to be the total evaluation value, and the write strategy that minimizes the total evaluation value is calculated as the optimum strategy.

Figure 3:
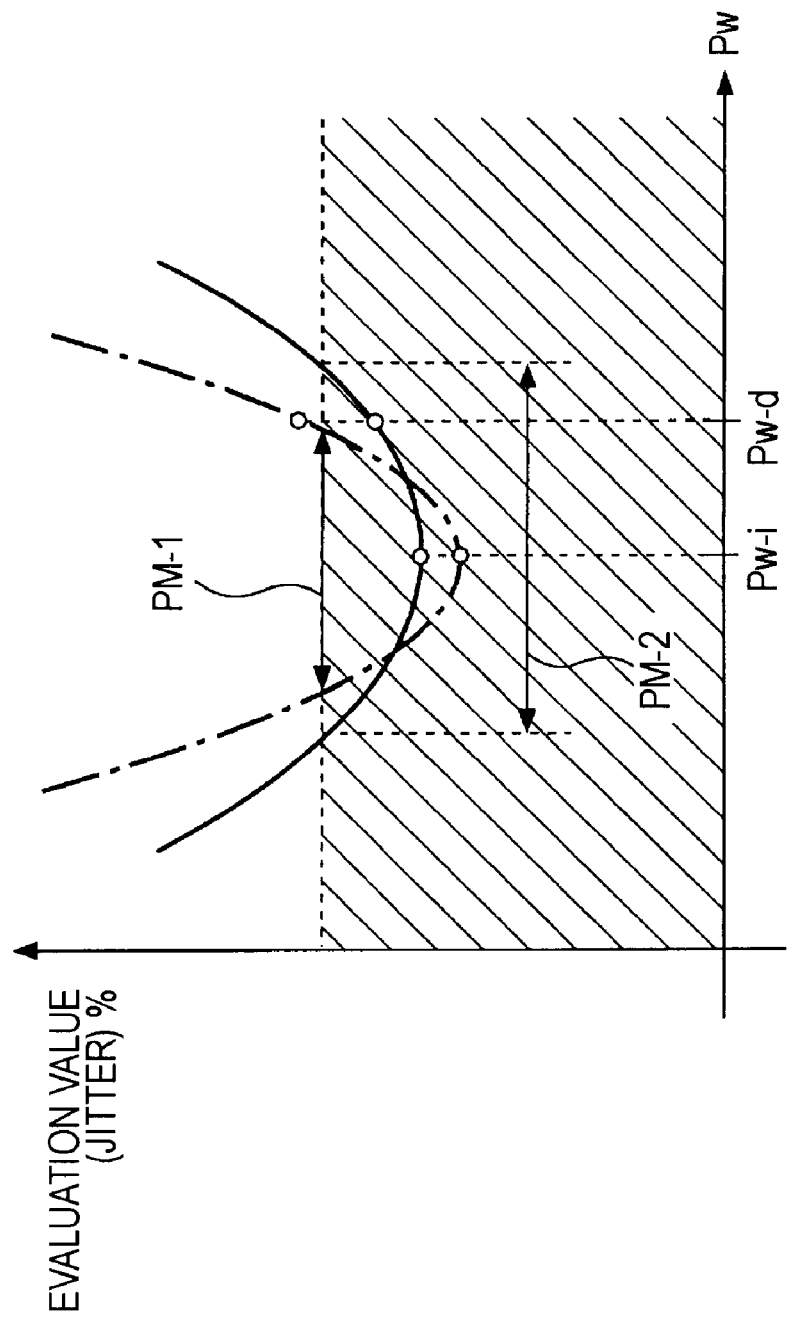
FIG. 3 is a diagram illustrating a comparison between a power margin in a case where strategy adjustments are performed by an approach employed in the embodiment of the present invention and a power margin in a case where strategy adjustments are performed by the approach of the related art.
Figure 8:
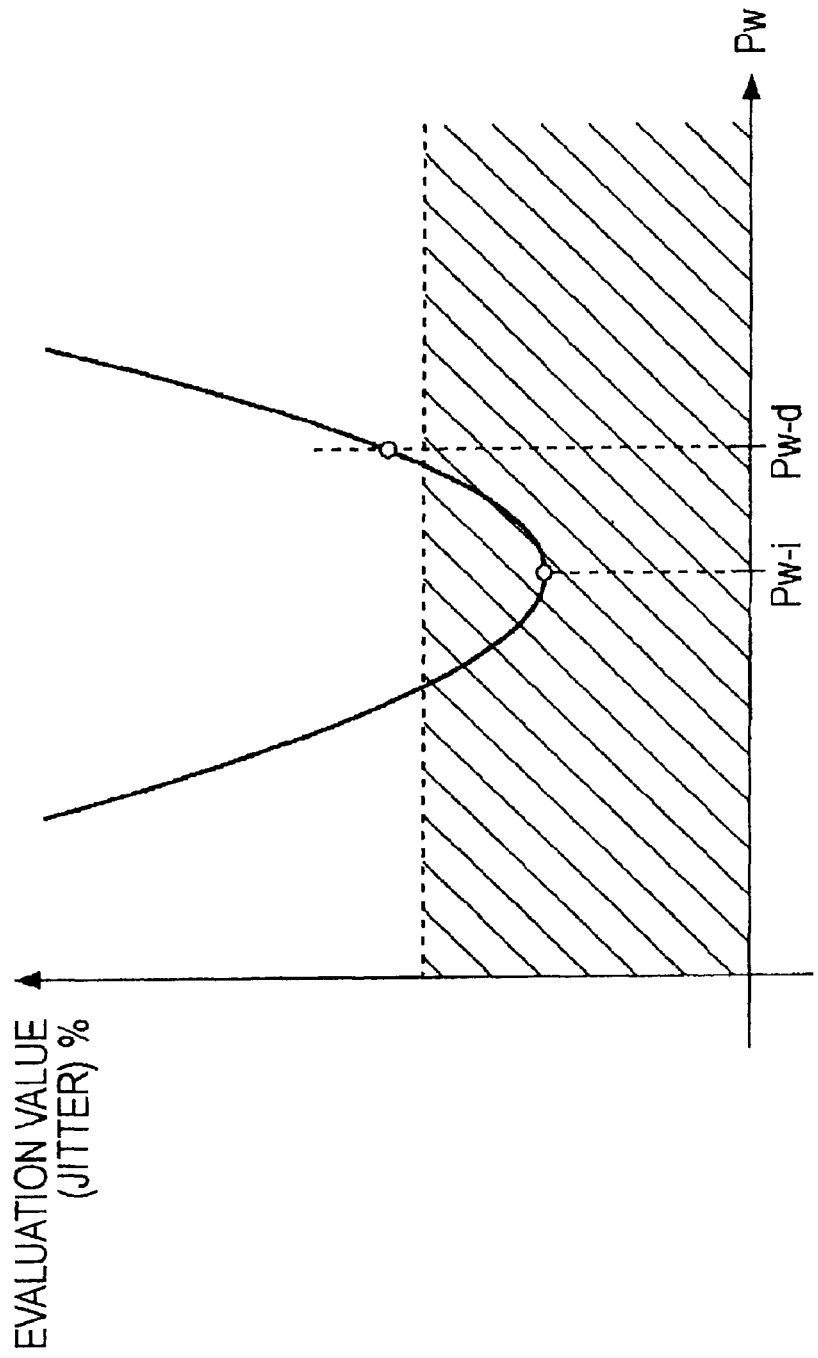
FIG. 8 illustrates the characteristic curve of an evaluation value (jitter) in relation to a change in the recording power in a case where the write strategy is adjusted by the related art.

FIG. 3 is a diagram illustrating a comparison between the approach employed in this embodiment (two levels of recording power are set) and the above-described approach of the related art (only one level of recording power is set). In FIG. 3, the characteristic curve of an evaluation value (jitter) in relation to a change in the recording power under the condition that the write strategy is adjusted with only one level of recording power, such as the characteristic curve shown in FIG. 8, is indicated by the one-dot-chain line. The characteristic curve of an evaluation value (jitter) in relation to a change in the recording power under the condition that the write strategy is adjusted by the approach employed in this embodiment is indicated by the solid line.

As described above, the recording power optimized by performing OPC may deviate from the real optimum recording power due to various factors. In FIG. 3, as in FIG. 8, the real optimum recording power is represented by Pw-i, while the position of the recording power deviated from the real optimum recording power Pw-i is designated by Pw-d.

In FIG. 3, the allowance value (i.e., the line that guarantees proper playback of a signal) of the jitter is indicated by the broken line. The power margin obtained by the approach of the related art is indicated by the range PM-1. In contrast, in the approach employed in this embodiment, the write strategy is adjusted on the basis of the quality evaluation value (total evaluation value) obtained by varying the write strategy for each of different levels of recording power. Accordingly, although the quality of a recording signal when the recording power coincides with the real optimum recording power Pw-i is lower, the quality of a recording signal in relation to a change in the recording power is not seriously decreased. In this case, for example, the power margin PM-2 is wider than the power margin PM-1.

Because of the increased power margin, even if the recording power deviates from the optimum recording power Pw-i to the position of recording power Pw-d, the jitter value does not exceed the allowance value, which is difficult in the approach of the related art. Also from this point of view, the quality of a recording signal can be maintained over a wide range of recording power.

3. Strategy Adjustment Operation 3-1. Overview of Adjustment Operation

An overview of the write strategy adjustment operation performed on the basis of the above-described approach is described below.

In this embodiment, the strategy adjustment operation is performed on the basis of the initial strategy. The initial strategy is strategy recommended information included in management information prestored in the optical disc 100 or strategy setting information stored in the recording/playback apparatus 1. In the recording/playback apparatus 1, the initial strategy in accordance with the manufacturer of the optical disc 1 or the type of the optical disc 100 may be stored.

Figure 4:
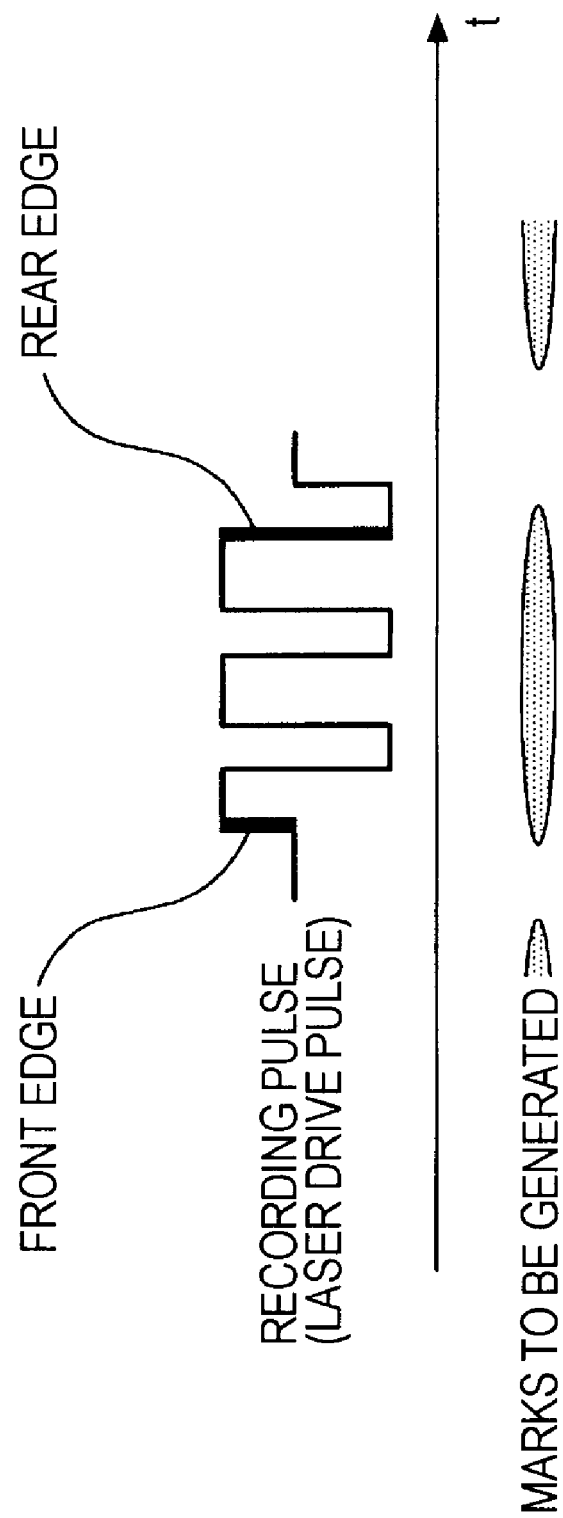
FIG. 4 illustrates pulse edge positions to be adjusted in strategy adjustments performed in the embodiment of the present invention.

It is now assumed that, in this embodiment, only edge positions of recording pulses are subjected to write strategy adjustments. The edge positions include front edges and rear edges of recording pulses (laser drive pulses), and the front and rear edges are adjusted, as shown FIG. 4.

In this embodiment, the amounts by which the front edge and the rear edge of recording pulses of a certain mark length are shifted from the reference strategy are determined as follows:

Front edge shift amount: WSF[T/32]
Rear edge shift amount: WSR[T/32]
where T indicates the channel clock cycle.

The front mark edge position error and the rear mark edge position error of a mark length when the level of recording power is $P_{wn}$ are indicated as follows:

Front mark edge position error: $MepeF_{Pwn}$
Rear mark edge position error: $MepeR_{Pwn}$.

In this embodiment, as stated above, adjustments are made only to the front edges and the rear edges of recording pulses. In this case, shifting, for example, a front edge changes the position of the front edge of a recording mark and also influences the position of the rear edge. Likewise, shifting a rear edge changes the position of the rear edge of a recording mark and also influences the position of the front edge.

In this embodiment, it is assumed that influences produced on the front edge and the rear edge of a recording mark by shifting the rear edge and the front edge of the recording pulses are linear, as expressed by the following equation (4):

$$\begin{bmatrix} MepeF_{Pwn} \\ MepeR_{Pwn} \end{bmatrix} = \begin{bmatrix} Cff_{Pwn} & Cfr_{Pwn} \\ Crf_{Pwn} & Crr_{Pwn} \end{bmatrix} \begin{bmatrix} WSF \\ WSR \end{bmatrix} + \begin{bmatrix} MepeFi_{Pwn} \\ MepeRi_{Pwn} \end{bmatrix} \quad (4)$$

where $MepeFi_{Pwn}$ and $MepeRi_{Pwn}$ designate the initial front mark edge position error and the initial rear mark edge position error, respectively, which are mark edge position errors when the amounts by which recording pulses are shifted (such amounts are hereinafter simply referred to as "recording pulse shift amounts") are zero. Hereinafter, the initial front mark edge position error and the initial rear mark edge position error may be simply referred to as the "initial mark edge position error".

In equation (4), $Cff_{Pwn}$, $Cfr_{Pwn}$, $Crf_{Pwn}$, and $Crr_{Pwn}$ indicate coefficients of the sensitivities to change in mark edge position errors by shifting recording pulses. Such coefficients may be simply referred to as "recording sensitivity coefficients" or "sensitivity coefficients".

The coefficients and the initial mark edge position error can be calculated by solving simultaneous equations using mark edge position errors ($MepeF_{Pwn}$ and $MepeR_{Pwn}$) obtained as a result of performing test recording with at least three write strategies for each level of recording power and the above-described strategy adjustment values (WSF and WSR) of the three write strategies. Details of such calculations are given below.

Improving the total recording quality under the condition that two levels of recording power Pw1 and Pw2 are set is now considered. If the mark edge position errors expressed by equation (4) hold true for each level of recording power, the relationship between the mark edge position errors and the recording pulse shift amount for a certain mark length can be expressed by the following equation (5).

$$\begin{bmatrix} MepeF_{Pw1} \\ MepeR_{Pw1} \\ \hline MepeF_{Pw2} \\ MepeR_{Pw2} \end{bmatrix} = \begin{bmatrix} Cff_{Pw1} & Cfr_{Pw1} \\ Crf_{Pw1} & Crr_{Pw1} \\ \hline Cff_{Pw2} & Cfr_{Pw2} \\ Crf_{Pw2} & Crr_{Pw2} \end{bmatrix} \begin{bmatrix} WSF \\ WSR \end{bmatrix} + \begin{bmatrix} MepeFi_{Pw1} \\ MepeRi_{Pw1} \\ \hline MepeFi_{Pw2} \\ MepeRi_{Pw2} \end{bmatrix} \quad (5)$$

It should be noted that, although the mark edge position errors, the initial mark edge position errors, and the sensitivity coefficients are different for each level of recording power, the recording pulse shift amounts remain the same regardless of the level of recording power.

For easy representation, if variable identifiers are given to the variables, as expressed by equations (6), (7), (8), and (9), equation (5) can be modified to equation (10).

$$Mepe := \begin{bmatrix} MepeF_{Pw1} \\ MepeR_{Pw1} \\ MepeF_{Pw2} \\ MepeR_{Pw2} \end{bmatrix} \quad (6)$$

$$C := \begin{bmatrix} Cff_{Pw1} & Cfr_{Pw1} \\ Crf_{Pw1} & Crr_{Pw1} \\ Cff_{Pw2} & Cfr_{Pw2} \\ Crf_{Pw2} & Crr_{Pw2} \end{bmatrix} \quad (7)$$

$$w := \begin{bmatrix} WSF \\ WSR \end{bmatrix} \quad (8)$$

$$Mepei := \begin{bmatrix} MepeFi_{Pw1} \\ MepeRi_{Pw1} \\ MepeFi_{Pw2} \\ MepeRi_{Pw2} \end{bmatrix} \quad (9)$$

$$Mepe = Cw + Mepei \quad (10)$$

In this embodiment, the mark edge position errors with the recording power levels Pw1 and Pw2 are determined to be quality evaluation values, and based on the quality evaluation values, strategy adjustments are performed. More specifically, the sum of the squares of the weighted quality evaluation values obtained under the condition that the recording power levels Pw1 and Pw2 are set is used as the total evaluation value, and the write strategy that minimizes the total evaluation value is calculated as the optimum strategy.

The total evaluation value Ev can be expressed by the following equation (11):

$$Ev = (Wf_{Pw1} \cdot MepeF_{Pw1})^2 + (Wr_{Pw1} \cdot MepeR_{Pw1})^2 + (Wf_{Pw2} \cdot MepeF_{Pw2})^2 + (Wr_{Pw2} \cdot MepeR_{Pw2})^2 \quad (11)$$

where $Wf_{Pw1}$, $Wr_{Pw1}$, $Wf_{Pw2}$, and $Wr_{Pw2}$ are weighting coefficients.

It is now considered that the recording pulse shift amount that minimizes the total evaluation value Ev expressed by equation (11) be efficiently calculated by the use of the above-described equation (10).

If such a recording pulse shift amount, i.e., the optimum recording pulse shift amount $w_O$, is expressed by the following equation (12), $$w_O := \begin{bmatrix} WSF_O \\ WSR_O \end{bmatrix} \quad (12)$$

the optimum recording pulse shift amount $w_O$ can be determined by, for example, the following equation (13):

$$w_O = -(RC)^{\#} R Mepei \quad (13)$$

where R represents a weighting matrix, which is expressed by the following equation (14).

$$R := \begin{bmatrix} Wf_{Pw1} & 0 & 0 & 0 \\ 0 & Wr_{Pw1} & 0 & 0 \\ 0 & 0 & Wf_{Pw2} & 0 \\ 0 & 0 & 0 & Wr_{Pw2} \end{bmatrix} \quad (14)$$

$(RC)^{\#}$ in equation (13) represents a pseudo inverse matrix of the matrix (RC), and it is modified to the following equation (15) for easy representation.

$$C_R := RC \quad (15)$$

Then, the pseudo inverse matrix $(RC)^{\#}$ can be expressed by the following equation (16).

$$(RC)^{\#} = C_R^{\#} = (C_R^T C_R)^{-1} C_R^T \quad (16)$$

3-2. Specific Operation Procedure

Then, the specific operation procedure for calculating the optimum recording pulse shift amount $w_O$ based on the above-described basic concept is described below.

An overview of the operation procedure includes the steps of:

(1) measuring mark edge position errors by means of test recording with three writes strategies under the condition that two levels of recording power Pw1 and Pw2 are set;

(2) calculating unknown coefficients $Cff_{Pwn}$, $Cfr_{Pwn}$, $Crf_{Pwn}$, and $Crr_{Pwn}$, $MepeFi_{Pwn}$, and $MepeRi_{Pwn}$ (n=1, 2)

(3) calculating write strategy; and (4) setting write strategy.

In the following operation procedure, the strategy is adjusted for each of the mark lengths, such as 2T, 3T, and 4T, by way of example.

(1) Measuring Mark Edge Position Errors with Three Write Strategies

In the above-described equation (5), the pulse shift amounts (WSF, WSR) are adjustable to desired values. The mark edge position errors (MepeF, MepeR) can be measured from a playback signal in accordance with the set pulse shift amounts.

By taking those factors into consideration, the sensitivity coefficient (C) and the initial mark edge position error (i) in equation (5) are unknown coefficients.

In equation (5), to calculate the two unknown coefficients such as the sensitivity coefficient (C) and the initial mark edge position error (i), the following procedure is taken. Test recording is performed for each of the three combinations of recording pulse shift amounts under the condition that each level of recording power is set. Then, by substituting the front/rear recording pulse shift amounts and the front/rear mark edge position errors measured for each level of recording power into equation (5), the simultaneous linear equations are solved.

Setting of the three write strategies used for test recording for calculating the unknown coefficients is as follows. If the recording pulse shift amounts of the three write strategies used for test recording displaced from the reference strategy are expressed by the following equation (17), $$wt_k := \begin{bmatrix} w_{Fk} \\ w_{Rk} \end{bmatrix} (k = 1, 2, 3) \quad (17)$$

it is necessary to select a combination of recording pulse shift amounts so that $wt_2 - wt_1$ and $wt_3 - wt_1$ be linear independent vectors in order to calculate unknown coefficients. For example, a combination of recording pulse shift amounts can be set, as expressed by the following equation (18):

$$wt_1 = \begin{bmatrix} -2[T/32] \\ 2[T/32] \end{bmatrix}, wt_2 = \begin{bmatrix} 2[T/32] \\ 2[T/32] \end{bmatrix}, wt_3 = \begin{bmatrix} -2[T/32] \\ -2[T/32] \end{bmatrix} \quad (18)$$

where T indicates the channel clock cycle; for example, in the case of Blu-ray® Disc, 2[T/32]=1[ns]. It should be noted that the time axis direction is positive.

Figure 5:
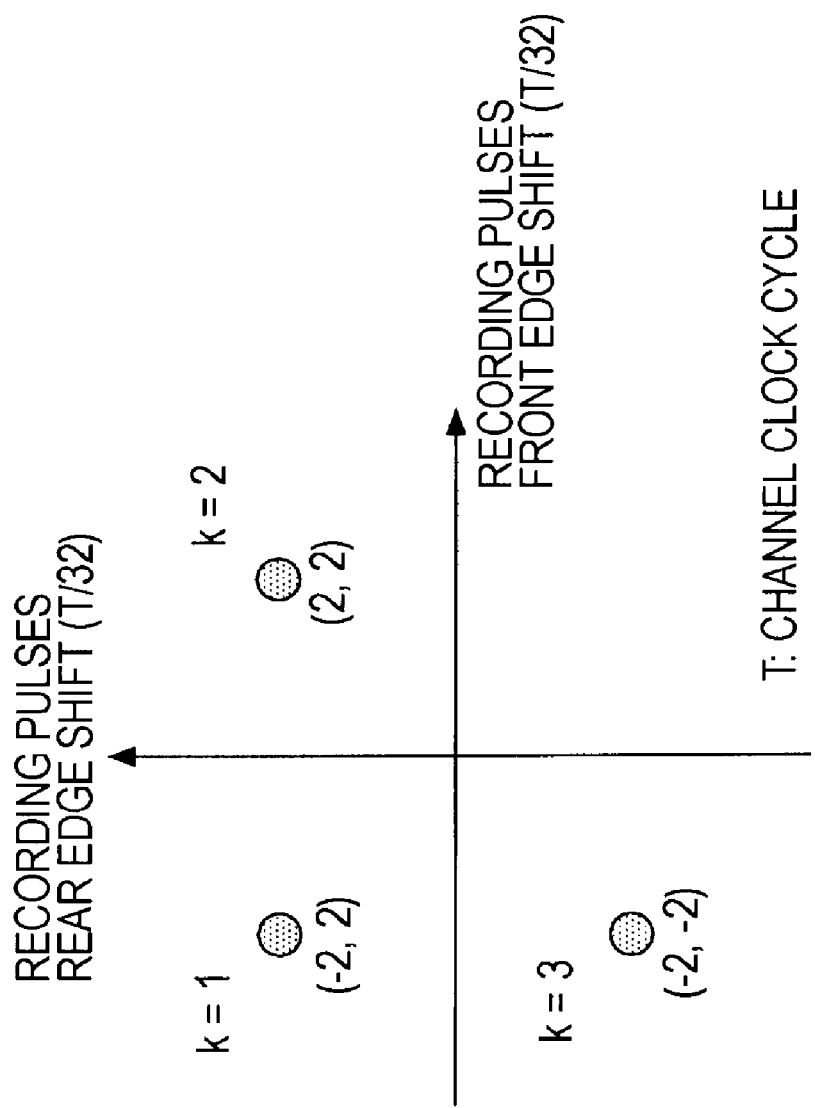
FIG. 5 illustrates a combination of front-edge shift amounts and rear-edge shift amounts to be set when strategy adjustments are performed in the embodiment of the present invention.

FIG. 5 illustrates the relationship of the three points $wt_1$, $wt_2$, and $wt_3$ on the coordinates axes. In this diagram, the horizontal axis represents the front edge shift amount, and the vertical axis indicates the rear edge shift amount.

The three recording pulse shift amounts expressed by equation (18) are applied to the write strategies for all the mark lengths 2T, 3T, and 4T, and such write strategies are set to be test-recording write strategies.

By the use of the three test-recording write strategies, test recording is first performed with the use of the recording power Pw1 so that the mark edge position error for each mark length can be measured. Then, such a mark edge position error is stored as the quality evaluation value obtained with the use of the recording power Pw1.

Test recording is also performed with the use of the recording power Pw2, and the quality evaluation value is measured and stored in a procedure similar to that with the use of the recording power Pw1.

(2) Calculating Unknown Coefficients

If the mark edge position error of a certain mark length obtained as a result of performing test recording with the use of the three write strategies $wt_1$, $wt_2$, and $wt_3$ under the condition that the recording power Pw1 is set is expressed by the following equation (19):

$$Mepe_{Pw1,tk} = \begin{bmatrix} MepeF_{Pw1.tk} \\ MepeR_{Pw1.tk} \end{bmatrix} \quad (k=1,2,3) \tag{19}$$

the above-described equation (4) can be modified to the following equation (20).

$$\begin{bmatrix} MepeF_{Pw1.t1} \\ MepeF_{Pw1.t2} \\ MepeF_{Pw1.t3} \end{bmatrix} = \begin{bmatrix} w_{F1} & w_{R1} & 1 \\ w_{F2} & w_{R2} & 1 \\ w_{F3} & w_{R3} & 1 \end{bmatrix} \begin{bmatrix} Cff_{Pw1} \\ Cfr_{Pw1} \\ MepeFi_{Pw1} \end{bmatrix} \tag{20}$$

$$\begin{bmatrix} MepeR_{Pw1.t1} \\ MepeR_{Pw1.t2} \\ MepeR_{Pw1.t3} \end{bmatrix} = \begin{bmatrix} w_{F1} & w_{R1} & 1 \\ w_{F2} & w_{R2} & 1 \\ w_{F3} & w_{R3} & 1 \end{bmatrix} \begin{bmatrix} Crf_{Pw1} \\ Crr_{Pw1} \\ MepeRi_{Pw1} \end{bmatrix}$$

Then, by calculating the simultaneous linear equations in equation (20), the unknown coefficients can be calculated, as expressed by the following equation (21).

$$\begin{bmatrix} Cff_{Pw1} \\ Cfr_{Pw1} \\ MepeFi_{Pw1} \end{bmatrix} = \begin{bmatrix} w_{F1} & w_{R1} & 1 \\ w_{F2} & w_{R2} & 1 \\ w_{F3} & w_{R3} & 1 \end{bmatrix}^{-1} \begin{bmatrix} MepeF_{Pw1.t1} \\ MepeF_{Pw1.t2} \\ MepeF_{Pw1.t3} \end{bmatrix} \tag{21}$$

$$\begin{bmatrix} Crf_{Pw1} \\ Crr_{Pw1} \\ MepeRi_{Pw1} \end{bmatrix} = \begin{bmatrix} w_{F1} & w_{R1} & 1 \\ w_{F2} & w_{R2} & 1 \\ w_{F3} & w_{R3} & 1 \end{bmatrix}^{-1} \begin{bmatrix} MepeR_{Pw1.t1} \\ MepeR_{Pw1.t2} \\ MepeR_{Pw1.t3} \end{bmatrix}$$

Similarly, the unknown coefficients under the condition that the recording power Pw2 is set can be calculated, as expressed by the following equation (22).

$$\begin{bmatrix} Cff_{Pw2} \\ Cfr_{Pw2} \\ MepeFi_{Pw2} \end{bmatrix} = \begin{bmatrix} w_{F1} & w_{R1} & 1 \\ w_{F2} & w_{R2} & 1 \\ w_{F3} & w_{R3} & 1 \end{bmatrix}^{-1} \begin{bmatrix} MepeF_{Pw2.t1} \\ MepeF_{Pw2.t2} \\ MepeF_{Pw2.t3} \end{bmatrix} \tag{22}$$

-continued $$\begin{bmatrix} Crf_{Pw2} \\ Crr_{Pw2} \\ MepeRi_{Pw2} \end{bmatrix} = \begin{bmatrix} w_{F1} & w_{R1} & 1 \\ w_{F2} & w_{R2} & 1 \\ w_{F3} & w_{R3} & 1 \end{bmatrix}^{-1} \begin{bmatrix} MepeR_{Pw2.t1} \\ MepeR_{Pw2.t2} \\ MepeR_{Pw2.t3} \end{bmatrix}$$

The above-described calculations are performed for each mark length so that all the unknown coefficients can be calculated.

(3) Calculating Write Strategies

As described above, for each of the mark lengths 2T, 3T, and 4T, the unknown coefficients $Cff_{Pw1}$, $Cfr_{Pw1}$, $Crf_{Pw1}$, and $Crr_{Pw1}$, $MepeFi_{Pw1}$, and $MepeRi_{Pw1}$ under the condition that the recording power Pw1 is used and the unknown coefficients $Cff_{Pw2}$, $Cfr_{Pw2}$, $Crf_{Pw2}$, and $Crr_{Pw2}$, $MepeFi_{Pw2}$, and $MepeRi_{Pw2}$ under the condition that the recording power Pw2 is set are determined.

Among the known coefficients, $Cff_{Pw1}$, $Cfr_{Pw1}$, $Crf_{Pw1}$, $Crr_{Pw1}$, $Cff_{Pw2}$, $Cfr_{Pw2}$, $Crf_{Pw2}$, and $Crr_{Pw2}$ can be simply represented by C, as expressed by equation (7), and $MepeFi_{Pw1}$, $MepeRi_{Pw1}$, $MepeFi_{Pw2}$, and $MepeRi_{Pw2}$ can be simply represented by Mepei, as expressed by equation (9).

In this manner, after the unknown coefficients C and Mepei are determined, they are simply substituted into the above-described equation (13) so that this equation is solved. As a result, the optimum recording pulse shift amount $w_0$ can be calculated for each mark length.

(4) Setting Write Strategy

The optimum recording pulse shift amount determined for each mark length as described above is supplied from the system controller 9 to the write strategy circuit 11 and is set therein.

Thereafter, the write strategy circuit 11 shifts each recording pulse edge for each mark length from the reference strategy by the optimum recording pulse shift amount set for the corresponding mark length. As a result, the recording operation can be performed with the write strategy that can improve the total recording quality under the condition that the two types of recording power Pw1 and Pw2 are set.

Figure 6:
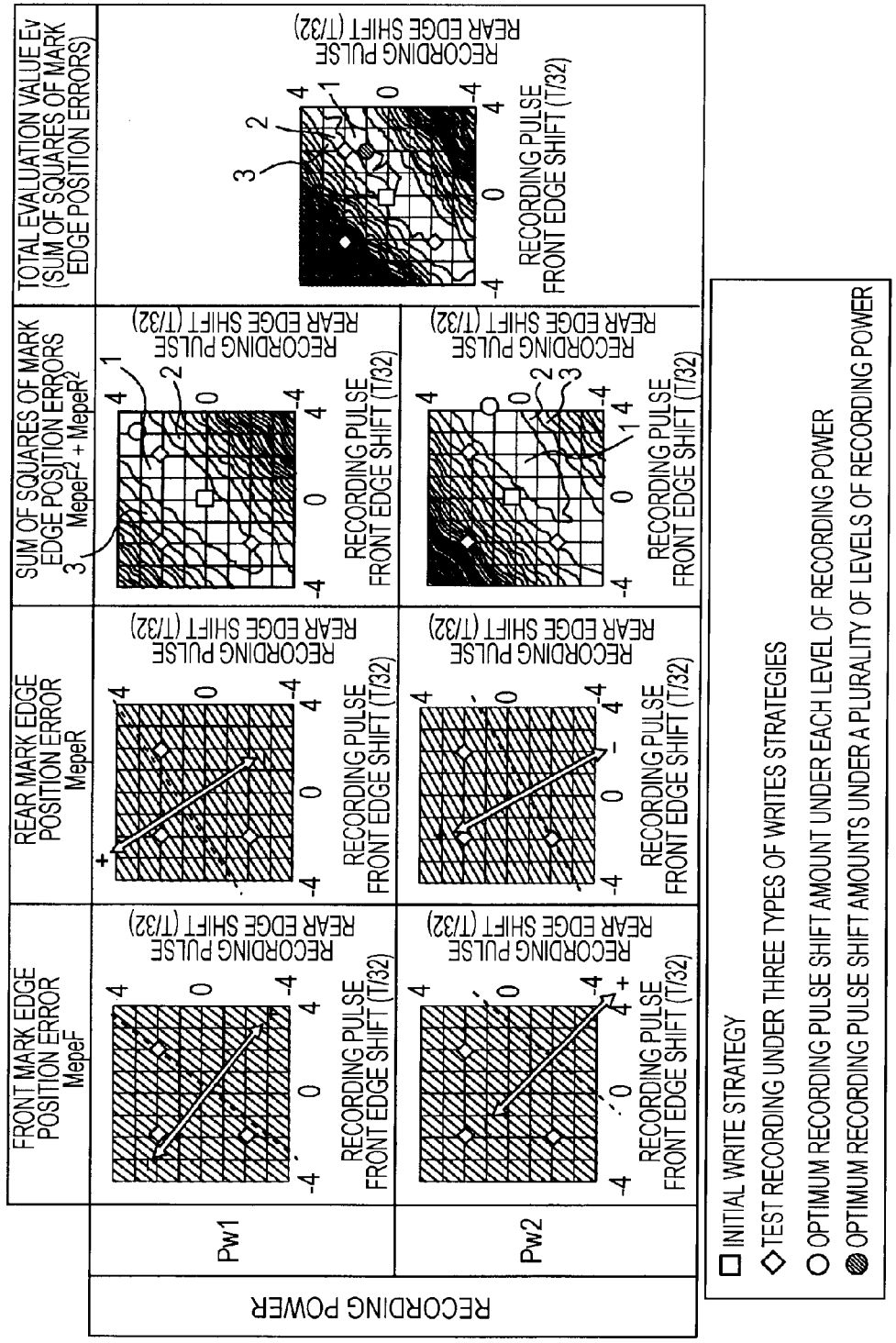
FIG. 6 illustrates the characteristics of the front mark edge position error, the rear mark edge position error, the sum of the squares of mark edge position errors, and the total evaluation value.

FIG. 6 illustrates the front mark edge position error, the rear mark edge position error, the sum of the squares of mark edge position errors, and the total evaluation value Ev.

Each diagram in FIG. 6 can be drawn from the results of measuring mark edge position errors when performing test recording with three write strategies. Each diagram is indicated by a contour map in which the x axis represents the front-edge recording pulse shift amount and the y axis designates the rear-edge recording pulse shift amount.

In FIG. 6, the first two columns from the left indicate the characteristics of the front mark edge position error and the rear mark edge position error, the positive and negative directions being indicated by the empty arrows. In FIG. 6, the first row indicates the measurement results under the condition that the recording power Pw1 is set, and the second row indicates the measurement results under the condition that the recording power Pw2 is set.

The third diagram from the left indicates the sum of the squares of the front mark edge position errors and the rear mark edge position errors under the condition that each level of recording power is set. In the third diagram, the sum of the squares of the mark edge position errors becomes larger in ascending order of the numbers appended to the contour lines. For example, the optimum recording pulse shift amount under the condition that each level of recording power is set is indicated by the voided circle.

The first column from the right represents the total evaluation value Ev determined from the results obtained for both the levels of recording power Pw1 and Pw2. The total evaluation value Ev is defined by the above-described equation (11), where the weighting coefficients $Wf_{Pw1}$, $Wr_{Pw1}$, $Wf_{Pw2}$, and $Wr_{Pw2}$ are all 1.0.

In this diagram, the total evaluation value Ev becomes larger in ascending order of the numbers appended to the contour lines. For example, in the rightmost column, the optimum recording pulse shift amount that can improve the total recording quality under the condition that the two levels of recording power Pw1 and Pw2 are set is represented by the hatched circle.

In FIG. 6, the optimum recording pulse shift amounts are rounded in units of [T/32].

4. Processing

Processing to be executed for implementing the above-described adjustment operation is described below with reference to the flowchart in FIG. 7.

Figure 7:
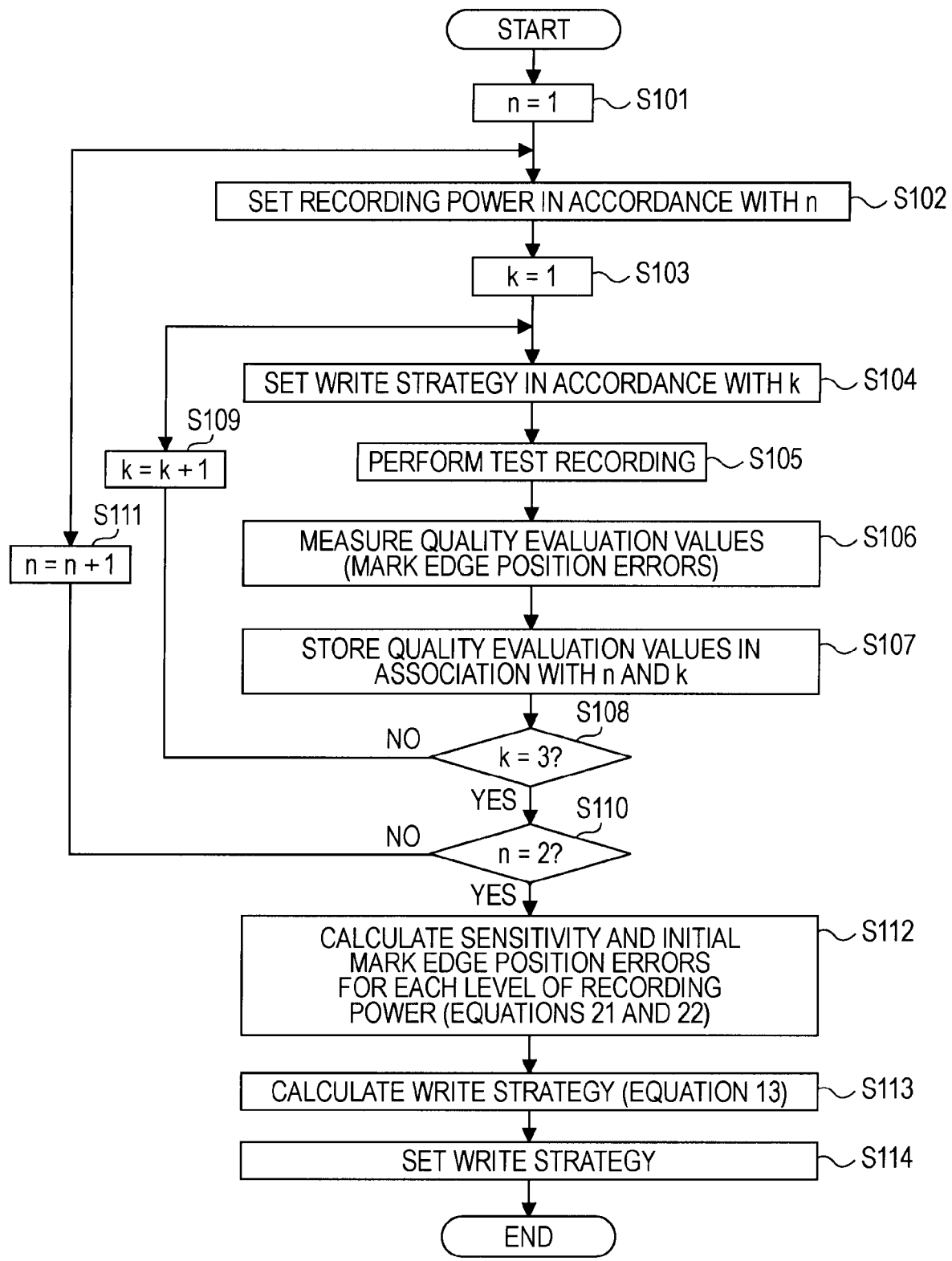
FIG. 7 is a flowchart illustrating processing for implementing the strategy adjustment operation performed in the embodiment of the present invention.

The processing shown in FIG. 7 is executed by the system controller 9 in accordance with a program stored in, for example, a built-in ROM of the system controller 9.

In step S101, the variable n is set to be 1. Then, in step S102, the recording power is set in the laser driver 10 in accordance with the variable n. That is, the recording power Pw1 is set.

In step S103, the variable k is set to be 1. Then, in step S104, the write strategy is set in the write strategy circuit 11 in accordance with the variable k. That is, the front edge shift amount and the rear edge shift amount for each mark length are set in $W_{Fk}$ and $W_{Rk}$, respectively, in equation (17).

In step S105, the system controller 9 performs test recording. In this case, the system controller 9 generates random data as test-recording data used for write strategy adjustments and supplies the generated random data to the recording data encoder 12. The recording data encoder 12 performs modulation, such as RLL(1, 7), on the random data, and the write strategy circuit 11 then forms a laser drive pulse waveform in accordance with the modulated data. In this case, the laser drive pulses for each mark length (in this case, 2T, 3T, and 4T) are generated such that the front and rear edges are shifted in accordance with the front edge shift amount $W_{Fk}$ and the rear edge shift amount $W_{Rk}$, respectively. Then, the laser drive pulses are supplied to the laser driver 10 so that the laser diode within the optical head 3 are driven to emit light. Test recording is performed in this manner.

Then, in step S106, the quality evaluation values (mark edge position errors) are measured.

More specifically, the optical head 3 and the elements forming the playback system are controlled to play back the data recorded in step S105. In this case, since the quality evaluation value calculator 8 calculates mark edge position errors for each adjustment pattern, the system controller 9 can receive the quality evaluation values to obtain the front mark edge position error and the rear mark edge position error for each of the mark lengths 2T, 3T, and 4T.

In step S107, the quality evaluation values for each mark length are stored in, for example, a built-in RAM, in association with the variables n and k.

Then, in step S108, it is checked whether the variable k is equal to 3. If the variable k is not 3, the process proceeds to step S109 in which the variable k is incremented by one. Then, steps S104 through S107 are repeated as described above. As a result, under the condition that each of the three write strategies is set, the front mark edge position error and the rear mark edge position error for each of the mark lengths 2T, 3T, and 4T are obtained.

If the variable k is found to be 3 in step S108, the process proceeds to step S110 to determine whether the variable n is equal to 2. If the variable n is not 2, the process proceeds to step S111 in which the variable n is incremented by one. Then, steps S102 through S109 are repeated as described above.

After executing steps S110 and S111, the recording power Pw2 is set this time. Then, with each of the three write strategies, the front mark edge position error and the rear mark edge position error for each of the mark lengths 2T, 3T, and 4T are calculated.

If the variable n is found to be 2 in step S110, the process proceeds to step S112. In step S112, the sensitivity and the initial mark edge position errors are calculated for each level of the recording power.

As discussed above, the sensitivity coefficients $Cff_{Pw1}$, $Cfr_{Pw1}$, $Crf_{Pw1}$, and $Crr_{Pw1}$ and the initial mark edge position errors $MepeFi_{Pw1}$, and $MepeRi_{Pw1}$ can be found by solving the above-described equation (21) if the three strategies are set to be $[W_{F1}, W_{R1}]$, $[W_{F2}, W_{R2}]$, and $[W_{F3}, W_{R3}]$ and the front mark edge errors obtained under the three strategies $[W_{F1}, W_{R1}]$, $[W_{F2}, W_{R2}]$, and $[W_{F3}, W_{R3}]$ with the recording power Pw1 are $MepeF_{Pw1,t1}$, $MepeF_{Pw1,t2}$, and $MepeF_{Pw1,t3}$, respectively, and the rear mark edge errors obtained under the three strategies $[W_{F1}, W_{R1}]$, $[W_{F2}, W_{R2}]$, and $[W_{F3}, W_{R3}]$ with the recording power Pw1 are $MepeR_{Pw1,t1}$, $MepeR_{Pw1,t2}$, and $MepeR_{Pw1,t3}$, respectively.

Similarly, the sensitivity coefficients $Cff_{Pw2}$, $Cfr_{Pw2}$, $Crf_{Pw2}$, and $Crr_{Pw2}$ and the initial mark edge position errors $MepeFi_{Pw2}$, and $MepeRi_{Pw2}$ can be found by solving the above-described equation (22) if the three strategies are set to be $[W_{F1}, W_{R1}]$, $[W_{F2}, W_{R2}]$, and $[W_{F3}, W_{R3}]$ and the front mark edge errors obtained under the three strategies $[W_{F1}, W_{R1}]$, $[W_{F2}, W_{R2}]$, and $[W_{F3}, W_{R3}]$ with the recording power Pw2 are $MepeF_{Pw2,t1}$, $MepeF_{Pw2,t2}$, and $MepeF_{Pw2,t3}$, respectively, and the rear mark edge errors obtained under the three strategies $[W_{F1}, W_{R1}]$, $[W_{F2}, W_{R2}]$, and $[W_{F3}, W_{R3}]$ with the recording power Pw2 are $MepeR_{Pw2,t1}$, $MepeR_{Pw2,t2}$, and $MepeR_{Pw2,t3}$, respectively.

The system controller 9 substitutes the three strategies $[W_{F1}, W_{R1}]$, $[W_{F2}, W_{R2}]$, and $[W_{F3}, W_{R3}]$ and the front mark edge position errors $MepeF_{Pw1,t1}$, $MepeF_{Pw1,t2}$, and $MepeF_{Pw1,t3}$ and the rear mark edge position errors $MepeR_{Pw1,t1}$, $MepeR_{Pw1,t2}$, and $MepeR_{Pw1,t3}$ into equation (21) and solves equation (21) to calculate the sensitivity coefficients $Cff_{Pw1}$, $Cfr_{Pw1}$, $Crf_{Pw1}$, and $Crr_{Pw1}$ and the initial mark edge position errors $MepeFi_{Pw1}$, and $MepeRi_{Pw1}$ for each mark length.

Similarly, the system controller 9 substitutes the three strategies $[W_{F1}, W_{R1}]$, $[W_{F2}, W_{R2}]$, and $[W_{F3}, W_{R3}]$ and the front mark edge position errors $MepeF_{Pw2,t1}$, $MepeF_{Pw2,t2}$, and $MepeF_{Pw2,t3}$ and the rear mark edge position errors $MepeR_{Pw2,t1}$, $MepeR_{Pw2,t2}$, and $MepeR_{Pw2,t3}$ into equation (22) and solves equation (22) to calculate the sensitivity coefficients $Cff_{Pw2}$, $Cfr_{Pw2}$, $Crf_{Pw2}$, and $Crr_{Pw2}$ and the initial mark edge position errors $MepeFi_{Pw2}$, and $MepeRi_{Pw2}$ for each mark length.

Subsequently, in step S113, the write strategy is calculated.

As discussed above, in step S112, for each of the mark lengths 2T, 3T, and 4T, the unknown coefficients $Cff_{Pw1}$, $Cfr_{Pw1}$, $Crf_{Pw1}$, and $Crr_{Pw1}$ and the initial mark edge position errors $MepeFi_{Pw1}$, and $MepeRi_{Pw1}$ under the condition that the recording power Pw1 is set, and the unknown coefficients $Cff_{Pw2}$, $Cfr_{Pw2}$, $Crf_{Pw2}$, and $Crr_{Pw2}$ and the initial mark edge position errors $MepeFi_{Pw2}$, and $MepeRi_{Pw2}$ under the condition that the recording power Pw2 is set are determined.

As discussed above, if the sensitivity coefficients $\text{Cff}_{Pw1}$, $\text{Cfr}_{Pw1}$, $\text{Crf}_{Pw1}$, $\text{Crr}_{Pw1}$, $\text{Cff}_{Pw2}$, $\text{Cfr}_{Pw2}$, $\text{Crf}_{Pw2}$, and $\text{Crr}_{Pw2}$ determined for a certain mark length are represented by C, and if the initial mark edge position errors $\text{MepeFi}_{Pw1}$, $\text{MepeRi}_{Pw1}$, $\text{MepeFi}_{Pw2}$, and $\text{MepeRi}_{Pw2}$ determined for a certain mark length are represented by Mepei, the optimum write strategy (optimum recording pulse shift amount $w_0 = \text{WSF}_0$, $\text{WSR}_0$) for the corresponding mark length can be determined by substituting C and Mepei into the above-described equation (13).

The system controller 9 performs calculations based on the sensitivity coefficient C and the initial mark edge position error Mepei according to equation (13) to determine the optimum recording pulse shift amount $w_0(\text{WSF}_0, \text{WSR}_0)$ for each mark length.

Then, in step S114, the optimum recording pulse shift amount $w_0(\text{WSF}_0, \text{WSR}_0)$ for each mark length is set in the write strategy circuit 11.

The write strategy adjustment operation is then completed.

It should be noted that OPC processing is performed for obtaining the recording power in the recording/playback apparatus 1 shown in FIG. 1. Accordingly, after the write strategy adjustment operation, the recording power to be set in the laser driver 10 when an actual recording operation is performed is the recording power adjusted by the OPC processing.

As described above, according to this embodiment, the write strategy that can improve the total recording signal quality under the condition that a plurality of levels of recording power are set can be calculated. With this configuration, a relatively high recording signal quality can be maintained to such a degree as to absorb deviation of the recording power from the optimum point, unlike a case where the write strategy is adjusted to a strategy that can minimize the quality evaluation value measured under the condition that only one level of recording power is set.

In this embodiment, it is assumed that the relationship between the front/rear recording pulse edge shift amounts and the front/rear edge position shift amounts (front mark edge position error and rear mark edge position error) of a recording mark is represented by equation (4) if it is represented on the basis of the initial mark edge position errors. Then, the optimum recording pulse shift amount $w_0(\text{WSF}_0, \text{WSR}_0)$ that minimizes the total evaluation value Ev expressed by equation (11) (i.e., the sum of the squares of the weighted front mark edge position error and the weighted rear mark edge position error under the condition that each of the two levels of recording power is set) can be found by an equation using a pseudo inverse matrix, such as that expressed by equation (13).

With this configuration, it is sufficient that test recording for determining the optimum recording pulse shift amount $w_0$ is performed only for three setting conditions (i.e., three write strategies k=1, 2, 3, such as those shown in FIG. 5), used for determining unknown coefficients, such as the sensitivity coefficient C and the initial mark edge position error Mepei. This can also be seen from the flowchart in FIG. 7 that test-recording operations are performed only three times for each of the two levels of recording power.

Reducing the number of test-recording operations in this manner can increase the speed in adjusting the write strategy.

The gist of this embodiment resides in that quality evaluation values are obtained by varying the write strategy for each of the two levels of recording power, and then, by considering the total quality evaluation value reflecting all the quality evaluation values, the optimum write strategy is determined. In addition to this approach, various other adjustment operations can be considered.

For example, a plurality of combinations of front/rear pulse shift amounts may be prepared, and the mark edge position errors may be measured for each combination of front/rear pulse shift amounts under the condition that a plurality of levels of recording power are set. Then, the resulting mark edge position errors may be substituted into equation (11) so that the total evaluation value Ev for each combination of the shift amounts can be calculated. Then, the combination of shift amounts that minimizes the total evaluation value Ev may be set to be the optimum pulse shift amount.

In this method, however, if the number of combinations of shift amounts used for test recording is small, the adjustment precision becomes lower. Accordingly, about several dozens of combinations of shift amounts are necessary. This necessitates about several dozens of test-recording operations for each level of recording power.

In contrast, in the method of the above-described embodiment, only three combinations of shift amounts are necessary for each level of recording power. This can increase the speed in adjusting the write strategy, as stated above.

According to the write strategy adjustment method of this embodiment, calculations and setting of optimum recording pulse shift amounts can be performed automatically by the recording/playback apparatus 1. This is less time-consuming, compared with a case where write strategy adjustments are performed manually to increase the power margin.

The write strategy adjustment method of this embodiment may be performed manually. This is also far less time-consuming, compared with a case where adjustments are performed through trial-and-error operations.

The write strategy adjustment method of this embodiment is an example only, and the present invention should not be restricted to this method. For example, various modified examples can be considered for the configuration of the recording/playback apparatus 1 and the adjustment operation procedure.

Additionally, in this embodiment, in performing write strategy adjustments, two levels of recording power Pw1 and Pw2 are used for calculating quality evaluation values. The levels of recording power may be changed according to the purpose of use. For example, three or more levels of recording power may be used, and quality evaluation value may be calculated for each level of recording power, and based on the plurality of quality evaluation values, write strategy adjustments may be performed.

If three or more levels or recording power are used, in addition to equations (21) and (22), other equations for the third or subsequent levels of recording power are necessary for determining unknown coefficients, such as the sensitivity coefficient C and the initial mark edge position error Mepei.

The recording power for the strategy adjustments may be set to be a value around the reference power (which is the recording power optimized by OPC: actual recording power which is set during recording).

Alternatively, if the set recording power is likely to be decreased in relation to the optimum point, it may be set to be lower than the reference recording power. In this manner, the level of recording power is set in accordance with how the actual recording power is shifted in relation to the optimum point. Then, the write strategy adjustments can be performed so that the power margin can be increased in the direction in which the actual recording power is shifted.

In the write strategy adjustments in this embodiment, only front mark edge positions and rear mark edge positions of laser drive pulses are adjusted. However, instead of front and rear mark edge positions, multi-pulse edge positions may be adjusted.

In practice, pulse edges of marks to be generated whose front edges and rear edges can be effectively adjusted can be suitably selected in accordance with the type of medium.

Adjustments are not restricted to edge positions of laser drive pulses, and the pulse amplitudes may be adjusted. For example, if stepwise pulses are used, the levels of steps may be adjusted.

As described above, the present invention can find wide applications when being used for parameters for laser drive pulses that can adjust mark edge positions formed on an optical disc.

In this embodiment, mark edge position errors used as quality evaluation values are obtained by subtracting the reference pattern (combination of a 5T or longer mark and a 5T or longer space) from the front and rear mark edge positions of an adjustment pattern. Alternatively, (1) mark edge position themselves may be defined as mark edge position errors. Or, (2) the average of all mark lengths may be used as the reference pattern to determine mark edge position errors.

That is, for the front mark edge position, the average $MepF_{XsXm}$ of front mark edge positions is used as the reference pattern, and for the rear mark edge position, the average $MepR_{XsXm}$ of rear mark edge positions is used as the reference pattern. Then, the value obtained by subtracting the average $MepF_{XsXm}$ from the front mark edge position of the adjustment pattern is set to be the front mark edge position error, while the value obtained by subtracting the average $MepR_{XsXm}$ from the rear mark edge position of the adjustment pattern is set to be the rear mark edge position error.

Alternatively, as the quality evaluation value, which serves as an index to strategy adjustments, evaluation values other than those using front mark edge position errors and rear mark position errors may be used. For example, to put it simply, errors from an ideal mark length and an ideal space length may be used.

Additionally, the quality evaluation value is calculated on the basis of the mark edge position, which represents the time difference between the cross points of the playback waveform and the slice level and the playback clock. Alternatively, the quality evaluation value may be calculated in a different manner, for example, as follows. In Viterbi decoding, for each combination of a mark and a space before and after a zero cross point of a decode bit sequence, the metric difference between the most likelihood path and the next candidate path obtained by shifting the most likelihood path by one bit (edge shifting) may be calculated. Then, the distribution of such metric differences may be statistically processed, and the resulting value may be used as the evaluation index to calculating edge and amplitude deviations.

Any type of quality evaluation value may be used as long as it is generated from a signal read from an optical recording medium and serves as an index to the recording signal quality under the condition that laser drive pulses are set.

In this embodiment, strategy adjustments are performed for each of the mark lengths, such as 2T, 3T, and 4T. However, as classification patterns for recording pulses to be adjusted, recording pulses may be classified in more details, for example, recording pulses including space lengths before or after the corresponding mark lengths may be subjected to strategy adjustments. Conversely, instead of classifying recording pulses into individual mark lengths, the entire mark length may be adjusted to the common write strategy.

Additionally, the sum of the squares of the quality evaluation values obtained under the condition that each of different levels of recording power is set is calculated as the total evaluation value. Alternatively, the average of the quality evaluation values obtained for the individual levels of recording power may be used as the total evaluation value.

Accordingly, the total evaluation value may be calculated in any manner as long as the overall quality evaluation values obtained for the individual levels of recording power are considered.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/playback apparatus comprising:
optical head means for applying laser light to an optical recording medium to read and write information represented by marks and spaces from and into the optical recording medium;
laser drive pulse generating means for generating laser drive pulses in accordance with information to be recorded and supplying the generated laser drive pulses to the optical head means to allow the optical head means to apply the laser light for recording the information;
power setting means for setting power of the laser light;
evaluation value calculating means for calculating a quality evaluation value, which serves as an index to the quality of a signal recorded based on a setting condition to which the laser drive pulses are set, from a signal read from the optical recording medium by the optical head means; and
adjustment control means for performing an adjustment setting for the laser drive pulses generated by the laser drive pulse generating means,
wherein the adjustment control means performs control such that recording operations for adjusting the laser drive pulses are performed on the optical recording medium by performing a first recording operation of writing test data at a first level of power of the laser light and at different adjustment setting conditions, and performing a second recording operation of writing the test data at a second level of power of the laser light different from the first level of power and at the different adjustment setting conditions to obtain quality evaluation values for the different adjustment setting conditions under the first and second levels of power of the laser light, calculates an initial front mark edge position error being a difference between a detected front mark edge position and a detected reference front mark edge position of a predetermined reference pattern, and an initial rear mark edge position error being a difference between a detected rear mark edge position and a detected reference rear mark edge position of the predetermined reference pattern corresponding to a condition that a front edge position shift amount and a rear edge position shift amount are zero, determines the adjustment setting for the laser drive pulses based on the quality evaluation values obtained by the evaluation value calculating means and the calculated initial front mark edge position error and the calculated rear mark edge position error, when the test data recorded during the recording operations is read for the different adjustment setting conditions under the first and second levels of the power of the laser light, and sets the determined adjustment setting in the laser drive pulse generating means, wherein the different adjustment setting conditions include settings for front edge position shift amounts by which front edge positions are shifted and rear edge position shift amounts by which rear edge positions are shifted, and wherein the predetermined reference pattern includes a predetermined combination of a space and a mark.

2. The recording/playback apparatus according to claim 1, wherein the adjustment control means determines the adjustment setting based on the sum of squares of weighted quality evaluation values calculated for the individual adjustment setting conditions under the first and second levels of the power of the laser light.

3. The recording/playback apparatus according to claim 1, wherein the evaluation value calculating means detects an edge position of a recording mark to be recorded on the optical recording medium from a signal read from the optical recording medium and calculates a mark edge position error, which is an error of the detected edge position of the recording mark from an ideal value, as the quality evaluation value.

4. The recording/playback apparatus according to claim 1, wherein the adjustment setting for the laser drive pulses is a setting for shift amounts by which edge positions of the laser drive pulses are shifted, and the adjustment control means performs control such that the recording operations for adjusting the laser drive pulses are performed on the optical recording medium by changing the shift amounts to different shift setting conditions to obtain a quality evaluation value for each shift amount of the edge positions under the first and second levels of the power of the laser light, and determines the shift amounts of the edge positions of the laser drive pulses on the basis of the quality evaluation values obtained for the shift amounts of the individual edge positions under the first and second levels of the power of the laser light.

5. The recording/playback apparatus according to claim 1, wherein the adjustment setting for the laser drive pulses is a setting for front edge position shift amounts by which front edge positions are shifted and rear edge position shift amounts by which rear edge positions are shifted, the evaluation value calculating means detects a front edge position and a rear edge position of a recording mark to be recorded on the optical recording medium from a signal read from the optical recording medium to calculate a front mark edge position error, which is an error of the detected front edge position from an ideal value, and a rear mark edge position error, which is an error of the detected rear edge position from an ideal value, the front mark edge position error and the rear mark edge position error being calculated as the quality evaluation values, and the adjustment control means performs control such that the recording operation for adjusting the laser drive pulses is performed on the optical recording medium for each of a plurality of shift setting conditions where different combinations of the front edge position shift amounts and the rear edge position shift amounts are used so as to obtain the front mark edge position error and the rear mark edge position error for each combination of the front edge position shift amount and the rear edge position shift amount under the first and second levels of the power of the laser light, and calculates a total evaluation value from the sum of squares of the weighted front mark edge position errors and the weighted rear mark edge position errors obtained for the individual combinations of the front edge position shift amounts and the rear edge position shift amounts under the first and second levels of the power of the laser light so as to determine the front edge position shift amount and the rear edge position shift amount that minimize the total evaluation value, and sets the determined front edge position shift amount and the rear edge position shift amount in the laser drive pulse generating means.

6. The recording/playback apparatus according to claim 5, wherein the adjustment control means calculates the front edge shift amount and the rear edge shift amount that minimize the total evaluation value, assuming that relationships between the front edge position shift amount and the rear edge position shift amount of the laser drive pulses and the front mark edge position error and the rear mark edge position error are expressed by the following equation:

$$\begin{bmatrix} MepeF_{Pwn} \\ MepeR_{Pwn} \end{bmatrix} = \begin{bmatrix} Cff_{Pwn} & Cfr_{Pwn} \\ Crf_{Pwn} & Crr_{Pwn} \end{bmatrix} \begin{bmatrix} WSF \\ WSR \end{bmatrix} + \begin{bmatrix} MepeFi_{Pwn} \\ MepeRi_{Pwn} \end{bmatrix}$$

where $MepeFi_{Pwn}$ and $MepeRi_{Pwn}$ represent the initial front mark edge position error and the initial rear mark edge position error, respectively, which are a front mark edge position error and a rear mark edge position error, respectively, when the front edge position shift amount and the rear edge position shift amount, respectively, of the laser drive pulses are zero under a condition that recording power n is set, $Cff_{Pwn}$, $Cfr_{Pwn}$, $Crf_{Pwn}$, and $Crr_{Pwn}$ designate sensitivity coefficients under a condition that the recording power n is set, WSF and WSR indicate the front edge position shift amount and the rear edge position shift amount, respectively, of the laser drive pulses, and $MepeF_{Pwn}$ and $MepeR_{Pwn}$ indicate the front mark edge position error and the rear mark edge position error, respectively.

7. The recording/playback apparatus according to claim 5, wherein, assuming that relationships between the front edge position shift amount and the rear edge position shift amount of the laser drive pulses and the front mark edge position error and the rear mark edge position error are expressed by the following equation:

$$\begin{bmatrix} MepeF_{Pwn} \\ MepeR_{Pwn} \end{bmatrix} = \begin{bmatrix} Cff_{Pwn} & Cfr_{Pwn} \\ Crf_{Pwn} & Crr_{Pwn} \end{bmatrix} \begin{bmatrix} WSF \\ WSR \end{bmatrix} + \begin{bmatrix} MepeFi_{Pwn} \\ MepeRi_{Pwn} \end{bmatrix}$$

where $MepeFi_{Pwn}$ and $MepeRi_{Pwn}$ represent the initial front mark edge position error and the initial rear mark edge position error, respectively, which are a front mark edge position error and a rear mark edge position error, respectively, when the front edge position shift amount and the rear edge position shift amount, respectively, of the laser drive pulses are zero under a condition that recording power n is set, $Cff_{Pwn}$, $Cfr_{Pwn}$, $Crf_{Pwn}$, and $Crr_{Pwn}$ designate sensitivity coefficients under a condition that the recording power n is set, WSF and WSR indicate the front edge position shift amount and the rear edge position shift amount, respectively, of the laser drive pulses, and $MepeF_{Pwn}$ and $MepeR_{Pwn}$ indicate the front mark edge position error and the rear mark edge position error, respectively, the adjustment control means calculates the front edge shift amount and the rear edge shift amount that minimize the total evaluation value by using the following equation:

$$w_O = -(RC)^\# R \text{Mepei}$$

where Mepei indicates the initial front mark edge position error and the initial rear mark edge position error under the first and second levels of the recording power, R represents a weighting coefficient for the total evaluation value, and C designates a sensitivity coefficient under the first and second levels of the recording power.

8. The recording/playback apparatus according to claim 1, wherein the evaluation value calculating means calculates the quality evaluation value for each mark length of the recording mark, and
the adjustment control means determines the adjustment setting for the laser drive pulses for each mark length.

9. The recording/playback apparatus according to claim 1, wherein the evaluation value calculating means calculates the quality evaluation value for each combination of a mark length of the recording mark and a space length before or after the mark length, and
the adjustment control means determines the adjustment setting for the laser drive pulses for each combination of a mark length and a space length before or after the mark length.

10. The recording playback application according to claim 1, wherein the predetermined combination of the space and the mark is a combination of at least a 5T space and at least a 5T mark, T being a clock cycle.

11. The recording playback application according to claim 1, wherein the test data includes a plurality of predetermined combinations of spaces and marks which are each shorter than the predetermined combination of the space and the mark included in the predetermined reference pattern.

12. A laser drive pulse adjusting method for a recording apparatus that applies laser light to an optical recording medium to record information represented by marks and spaces on the optical recording medium, comprising:
performing a first recording operation of writing test data at a first level of power of the laser light and adjusting laser drive pulses on the optical recording medium by changing an adjustment setting for the laser drive pulses to different adjustment setting conditions and performing a second recording operation of writing the test data at a second level of power of the laser light different from the first level of power and at the different adjustment setting conditions;
calculating quality evaluation values, which serve as an index to the quality of a signal recorded based on the different adjustment setting conditions and under the first and second levels of the power of the laser light, by reading the test data recorded in the recording operations;
calculating an initial front mark edge position error being a difference between a detected front mark edge position and a detected reference front mark edge position of a predetermined reference pattern, and an initial rear mark edge position error being a difference between a detected rear mark edge position and a detected reference rear mark edge position of the predetermined reference pattern corresponding to a condition that a front edge position shift amount and a rear edge position shift amount are zero;
obtaining quality evaluation values for the different adjustment setting conditions under the first and second levels of the power of the laser light and determining the adjustment setting for the laser drive pulses based on the quality evaluation values obtained for the different adjustment setting conditions under the first and second levels of the power of the laser light and the calculated initial front mark edge position error and the calculated rear mark edge position error; and
setting the determined adjustment setting so that the laser drive pulses are generated with the determined adjustment setting, and wherein the different adjustment setting conditions include settings for front edge position shift amounts by which front edge positions are shifted and rear edge position shift amounts by which rear edge positions are shifted, and
wherein the predetermined reference pattern includes a predetermined combination of a space and a mark.

13. A recording/playback apparatus comprising:
an optical head unit configured to apply laser light to an optical recording medium and to read and write information represented by marks and spaces from and into the optical recording medium;
a laser drive pulse generator configured to generate laser drive pulses in accordance with information to be recorded and to supply the generated laser drive pulses to the optical head unit to allow the optical head unit to apply the laser light for recording the information;
a power setting unit configured to set power of the laser light generated by the laser drive pulse generator;
an evaluation value calculator configured to calculate a quality evaluation value, which serves as an index to the quality of a signal recorded based on a setting condition to which the laser drive pulses are set, from a signal read from the optical recording medium by the optical head unit; and
an adjustment controller configured to perform an adjustment setting for the laser drive pulses generated by the laser drive pulse generator,
wherein the adjustment controller performs control such that recording operations for adjusting the laser drive pulses are performed on the optical recording medium by performing a first recording operation of writing test data at a first level of power of the laser light and at different adjustment setting conditions, and performing a second recording operation of writing the test data at a second level of power of the laser light different from the first level of power and at the different adjustment setting conditions to obtain quality evaluation values for the different adjustment setting conditions under the first and second levels of power of the laser light, calculates an initial front mark edge position error being a difference between a detected front mark edge position and a detected reference front mark edge position of a predetermined reference pattern, and an initial rear mark edge position error being a difference between a detected rear mark edge position and a detected reference rear mark edge position of the predetermined reference pattern corresponding to a condition that a front edge position shift amount and a rear edge position shift amount are zero, determines the adjustment setting for the laser drive pulses based on the quality evaluation values obtained by the evaluation value calculator and the calculated initial front mark edge position error and the calculated rear mark edge position error when the test data recorded during the recording operations is read for the different adjustment setting conditions and under the first and second levels of the power of the laser light, and sets the determined adjustment setting in the laser drive pulse generator,
wherein the different adjustment setting conditions include settings for front edge position shift amounts by which front edge positions are shifted and rear edge position shift amounts by which rear edge positions are shifted and
wherein the predetermined reference pattern includes a predetermined combination of a space and a mark.

* * * * *